(12) United States Patent
Hendrix

(10) Patent No.: US 10,172,760 B2
(45) Date of Patent: Jan. 8, 2019

(54) RESPONSIVE ROUTE GUIDANCE AND IDENTIFICATION SYSTEM

(71) Applicant: Jennifer Hendrix, Waxahachie, TX (US)

(72) Inventor: Jennifer Hendrix, Waxahachie, TX (US)

(*) Notice: Subject to any disclaimer, the term of this patent is extended or adjusted under 35 U.S.C. 154(b) by 32 days.

(21) Appl. No.: 15/410,410

(22) Filed: Jan. 19, 2017

(65) Prior Publication Data

US 2018/0200138 A1 Jul. 19, 2018

(51) Int. Cl.
*G01C 21/36* (2006.01)
*G01S 13/88* (2006.01)
(Continued)

(52) U.S. Cl.
CPC ............ *A61H 3/061* (2013.01); *G01C 21/206* (2013.01); *G01C 21/3407* (2013.01); *G01C 21/3608* (2013.01); *G01C 21/3629* (2013.01); *G01C 21/3652* (2013.01); *G01C 21/3679* (2013.01); *G01S 13/88* (2013.01); *G06F 3/167* (2013.01); *H04W 4/043* (2013.01)

(58) Field of Classification Search
CPC ...... G01C 21/206; G01C 21/26; G01C 21/34; G01C 21/3407; G01C 21/3608; G01C 21/3629; H04W 4/00; H04W 4/043; H04W 64/00; G01S 13/88; G01S 5/00; G01S 5/14; A61H 3/061
See application file for complete search history.

(56) References Cited

U.S. PATENT DOCUMENTS 3,967,277 A  6/1976  Hastings
4,520,501 A  5/1985  DuBrucq
(Continued)

FOREIGN PATENT DOCUMENTS

WO   WO1995004440   2/1995
WO   WO9949656      9/1999
(Continued)

OTHER PUBLICATIONS

Office Action from U.S. Patent and Trademark Office dated Feb. 2, 2016 from corresponding U.S. Appl. No. 14/703,148.
(Continued)

*Primary Examiner* — Yonel Beaulieu
(74) *Attorney, Agent, or Firm* — Law Office of Jeff Williams PLLC; J. Oliver Williams

(57) ABSTRACT

The present application discloses a responsive route guidance and identification system for providing route guidance and real time communication to a user related to course corrections along a route to avoid potential obstacles. The system includes a portable electronic device is configured to receive data from a location application software and a sensor module. The data received is processed to generate a route. The sensor module is configured to detect objects or obstructions along the route. The location application software is configured to receive and provide layout data of a particular area to be traversed. The system may optionally include a terminal and one or more transmitters to assist with location and navigation inside a structure. Communication is manifested to the user through audible or sensory methods.

19 Claims, 5 Drawing Sheets

(51) Int. Cl.
*H04W 4/00* (2018.01)
*A61H 3/00* (2006.01)
*A61H 3/06* (2006.01)
*H04W 4/04* (2009.01)
*G06F 3/16* (2006.01)
*G01C 21/20* (2006.01)
*G01C 21/34* (2006.01)

(56) References Cited

U.S. PATENT DOCUMENTS

| | | |
|---|---|---|
| 4,586,827 A | 5/1986 | Hirsch et al. |
| 5,047,952 A | 9/1991 | Kramer |
| 5,097,856 A | 3/1992 | Chi-Sheng |
| 5,129,716 A | 7/1992 | Holakovszky et al. |
| 5,265,272 A | 11/1993 | Kurcbart |
| 5,463,428 A | 10/1995 | Lipton et al. |
| 5,508,699 A | 4/1996 | Silverman |
| 5,539,665 A | 7/1996 | Lamming et al. |
| 5,543,802 A | 8/1996 | Villevieille |
| 5,544,050 A | 8/1996 | Abe |
| 5,568,127 A | 10/1996 | Bang |
| 5,636,038 A | 6/1997 | Lynt |
| 5,659,764 A | 8/1997 | Sakiyama |
| 5,701,356 A | 12/1997 | Stanford et al. |
| 5,733,127 A | 3/1998 | Mecum |
| 5,807,111 A | 9/1998 | Schrader |
| 5,872,744 A | 2/1999 | Taylor |
| 5,953,693 A | 9/1999 | Sakiyama |
| 5,956,630 A | 9/1999 | Mackey |
| 5,982,286 A | 11/1999 | Vanmoor |
| 6,009,577 A | 1/2000 | Day |
| 6,029,069 A | 2/2000 | Takaki |
| 6,055,048 A | 4/2000 | Langevin et al. |
| 6,067,112 A | 5/2000 | Wellner et al. |
| 6,199,010 B1 | 3/2001 | Richton |
| 6,229,901 B1 | 5/2001 | Mickelson et al. |
| 6,230,135 B1 | 5/2001 | Ramsay |
| 6,230,349 B1 | 5/2001 | Silver et al. |
| 6,285,757 B1 | 9/2001 | Carroll et al. |
| 6,307,526 B1 | 10/2001 | Mann |
| 6,323,807 B1 | 11/2001 | Golding et al. |
| 6,349,001 B1 | 2/2002 | Spitzer |
| 6,466,232 B1 | 10/2002 | Newell |
| 6,542,623 B1 | 4/2003 | Kahn |
| 6,580,999 B2 | 6/2003 | Maruyama et al. |
| 6,594,370 B1 | 7/2003 | Anderson |
| 6,603,863 B1 | 8/2003 | Nagayoshi |
| 6,619,836 B1 | 9/2003 | Silvant et al. |
| 6,701,296 B1 | 3/2004 | Kramer |
| 6,774,788 B1 | 8/2004 | Balfe |
| 6,807,478 B2 | 10/2004 | Giannopoulos |
| 6,825,875 B1 | 11/2004 | Strub et al. |
| 6,826,477 B2 | 11/2004 | Ladetto et al. |
| 6,834,373 B2 | 12/2004 | Dieberger |
| 6,839,667 B2 | 1/2005 | Reich |
| 6,857,775 B1 | 2/2005 | Wilson |
| 6,920,229 B2 | 7/2005 | Boesen |
| D513,997 S | 1/2006 | Wilson |
| 7,027,874 B1 | 4/2006 | Sawan et al. |
| D522,300 S | 6/2006 | Roberts |
| 7,069,215 B1 | 6/2006 | Bangalore |
| 7,106,220 B2 | 9/2006 | Gourgey et al. |
| 7,228,275 B1 | 6/2007 | Endo |
| 7,299,034 B2 | 11/2007 | Kates |
| 7,308,314 B2 | 12/2007 | Havey et al. |
| 7,336,226 B2 | 2/2008 | Jung et al. |
| 7,356,473 B2 | 4/2008 | Kates |
| 7,413,554 B2 | 8/2008 | Kobayashi et al. |
| 7,417,592 B1 | 8/2008 | Hsiao et al. |
| 7,428,429 B2 | 9/2008 | Gantz et al. |
| 7,463,188 B1 | 12/2008 | McBurney |
| 7,496,445 B2 | 2/2009 | Mohsini |
| 7,501,958 B2 | 3/2009 | Saltzstein et al. |
| 7,564,469 B2 | 7/2009 | Cohen |
| 7,565,295 B1 | 7/2009 | Hernandez-Rebollar |
| 7,584,048 B2 | 9/2009 | Pham |
| 7,598,976 B2 | 10/2009 | Sofer et al. |
| 7,618,260 B2 | 11/2009 | Daniel et al. |
| D609,818 S | 2/2010 | Tsang et al. |
| 7,656,290 B2 | 2/2010 | Fein et al. |
| 7,659,915 B2 | 2/2010 | Kurzweil et al. |
| 7,743,996 B2 | 6/2010 | Maciver |
| D625,427 S | 10/2010 | Lee |
| 7,843,488 B2 | 11/2010 | Stapleton |
| 7,848,512 B2 | 12/2010 | Eldracher |
| 7,864,991 B2 | 1/2011 | Espenlaub et al. |
| 7,938,756 B2 | 5/2011 | Rodetsky et al. |
| 7,991,576 B2 | 8/2011 | Roumeliotis |
| 8,005,263 B2 | 8/2011 | Fujimura |
| 8,035,519 B2 | 10/2011 | Davis |
| D649,655 S | 11/2011 | Petersen |
| 8,123,660 B2 | 2/2012 | Kruse et al. |
| D656,480 S | 3/2012 | McManigal et al. |
| 8,138,907 B2 | 3/2012 | Barbeau et al. |
| 8,150,107 B2 | 4/2012 | Kurzweil et al. |
| 8,177,705 B2 | 5/2012 | Abolfathi |
| 8,239,032 B2 | 8/2012 | Dewhurst |
| 8,253,760 B2 | 8/2012 | Sako et al. |
| 8,300,862 B2 | 10/2012 | Newton et al. |
| 8,325,263 B2 | 12/2012 | Kato et al. |
| D674,501 S | 1/2013 | Petersen |
| 8,359,122 B2 | 1/2013 | Koselka et al. |
| 8,395,968 B2 | 3/2013 | Vartanian et al. |
| 8,401,785 B2 | 3/2013 | Cho et al. |
| 8,414,246 B2 | 4/2013 | Tobey |
| 8,418,705 B2 | 4/2013 | Ota et al. |
| 8,428,643 B2 | 4/2013 | Lin |
| 8,483,956 B2 | 7/2013 | Zhang |
| 8,494,507 B1 | 7/2013 | Tedesco et al. |
| 8,494,859 B2 | 7/2013 | Said |
| 8,538,687 B2 | 9/2013 | Plocher et al. |
| 8,538,688 B2 | 9/2013 | Prehofer |
| 8,571,860 B2 | 10/2013 | Strope |
| 8,583,282 B2 | 11/2013 | Angle et al. |
| 8,588,464 B2 | 11/2013 | Albertson et al. |
| 8,588,972 B2 | 11/2013 | Fung |
| 8,594,935 B2 | 11/2013 | Cioffi et al. |
| 8,606,316 B2 | 12/2013 | Evanitsky |
| 8,610,879 B2 | 12/2013 | Ben-Moshe et al. |
| 8,630,633 B1 | 1/2014 | Tedesco et al. |
| 8,676,274 B2 | 3/2014 | Li |
| 8,676,623 B2 | 3/2014 | Gale et al. |
| 8,694,251 B2 | 4/2014 | Janardhanan et al. |
| 8,704,902 B2 | 4/2014 | Naick et al. |
| 8,743,145 B1 | 6/2014 | Price |
| 8,750,898 B2 | 6/2014 | Haney |
| 8,768,071 B2 | 7/2014 | Tsuchinaga et al. |
| 8,786,680 B2 | 7/2014 | Shiratori |
| 8,797,141 B2 | 8/2014 | Best et al. |
| 8,797,386 B2 | 8/2014 | Chou et al. |
| 8,803,699 B2 | 8/2014 | Foshee et al. |
| 8,814,019 B2 | 8/2014 | Dyster et al. |
| 8,825,398 B2 | 9/2014 | Alexandre |
| 8,836,532 B2 | 9/2014 | Fish, Jr. et al. |
| 8,836,580 B2 | 9/2014 | Mendelson |
| 8,836,910 B2 | 9/2014 | Cashin et al. |
| 8,902,303 B2 | 12/2014 | Na'Aman et al. |
| 8,909,534 B1 | 12/2014 | Heath |
| D721,673 S | 1/2015 | Park et al. |
| 8,926,330 B2 | 1/2015 | Taghavi |
| 8,930,458 B2 | 1/2015 | Lewis et al. |
| 8,981,682 B2 | 3/2015 | Delson et al. |
| D727,194 S | 4/2015 | Wilson |
| 9,004,330 B2 | 4/2015 | White |
| 9,025,016 B2 | 5/2015 | Wexler et al. |
| 9,053,094 B2 | 6/2015 | Yassa |
| 9,076,450 B1 | 7/2015 | Sadek |
| 9,081,079 B2 | 7/2015 | Chao et al. |
| 9,081,385 B1 | 7/2015 | Ferguson |
| D736,741 S | 8/2015 | Katz |
| 9,111,545 B2 | 8/2015 | Jadhav et al. |
| 9,116,003 B2 | 8/2015 | Khorashadi |
| D738,238 S | 9/2015 | Pede et al. |
| 9,137,484 B2 | 9/2015 | DiFrancesco et al. |

(56) References Cited

U.S. PATENT DOCUMENTS

| | | |
|---|---|---|
| 9,137,639 B2 | 9/2015 | Garin et al. |
| 9,140,554 B2 | 9/2015 | Jerauld |
| 9,148,191 B2 | 9/2015 | Teng et al. |
| 9,158,378 B2 | 10/2015 | Hirukawa |
| D742,535 S | 11/2015 | Wu |
| D743,933 S | 11/2015 | Park et al. |
| 9,190,058 B2 | 11/2015 | Klein |
| 9,230,430 B2 | 1/2016 | Civelli et al. |
| 9,267,801 B2 | 2/2016 | Gupta et al. |
| 9,269,015 B2 | 2/2016 | Boncyk |
| 9,304,588 B2 | 4/2016 | Aldossary |
| D756,958 S | 5/2016 | Lee et al. |
| D756,959 S | 5/2016 | Lee et al. |
| 9,335,175 B2 | 5/2016 | Zhang et al. |
| 9,341,014 B2 | 5/2016 | Oshima et al. |
| 9,355,547 B2 | 5/2016 | Stevens et al. |
| 9,429,433 B2 * | 8/2016 | Hendrix ............... G01C 21/206 |
| 9,726,504 B2 * | 8/2017 | Rachuri ................ G01C 21/32 |
| 2001/0023387 A1 | 9/2001 | Rollo |
| 2002/0067282 A1 | 6/2002 | Moskowitz et al. |
| 2002/0071277 A1 | 6/2002 | Starner et al. |
| 2002/0075323 A1 | 6/2002 | O'Dell |
| 2002/0173346 A1 | 11/2002 | Wang |
| 2002/0178344 A1 | 11/2002 | Bourguet |
| 2003/0026461 A1 | 2/2003 | Hunter |
| 2003/0133085 A1 | 7/2003 | Tretiakoff |
| 2003/0179133 A1 | 9/2003 | Pepin et al. |
| 2004/0232179 A1 | 11/2004 | Chauhan |
| 2004/0267442 A1 | 12/2004 | Fehr et al. |
| 2005/0020845 A1 | 9/2005 | Fink et al. |
| 2005/0221260 A1 | 10/2005 | Kikuchi |
| 2006/0004512 A1 | 1/2006 | Herbst |
| 2006/0028550 A1 | 2/2006 | Palmer |
| 2006/0029256 A1 | 2/2006 | Miyoshi |
| 2006/0129308 A1 | 6/2006 | Kates |
| 2006/0293839 A1 | 6/2006 | Stankiewicz |
| 2006/0177086 A1 | 8/2006 | Rye et al. |
| 2006/0184318 A1 | 8/2006 | Yoshimine |
| 2006/0292533 A1 | 12/2006 | Selod |
| 2007/0001904 A1 | 1/2007 | Mendelson |
| 2007/0052672 A1 | 3/2007 | Ritter et al. |
| 2007/0173688 A1 | 7/2007 | Kim |
| 2007/0296572 A1 | 12/2007 | Fein |
| 2008/0024594 A1 | 1/2008 | Ritchey |
| 2008/0068559 A1 | 3/2008 | Howell |
| 2008/0120029 A1 | 5/2008 | Zelek et al. |
| 2008/0145822 A1 | 6/2008 | Bucchieri |
| 2008/0174676 A1 | 7/2008 | Squilla et al. |
| 2008/0198222 A1 | 8/2008 | Gowda |
| 2008/0198324 A1 | 8/2008 | Fuziak |
| 2008/0251110 A1 | 10/2008 | Pede |
| 2008/0260210 A1 | 10/2008 | Kobeli |
| 2009/0012788 A1 | 1/2009 | Gilbert |
| 2009/0040215 A1 | 2/2009 | Afzulpurkar |
| 2009/0118652 A1 | 5/2009 | Carlucci |
| 2009/0122161 A1 | 5/2009 | Bolkhovitinov |
| 2009/0122648 A1 | 5/2009 | Mountain et al. |
| 2009/0177437 A1 | 7/2009 | Roumeliotis |
| 2009/0189974 A1 | 7/2009 | Deering |
| 2010/0041378 A1 | 2/2010 | Aceves |
| 2010/0070173 A1 | 3/2010 | Sakamoto |
| 2010/0109918 A1 | 5/2010 | Liebermann |
| 2010/0110368 A1 | 5/2010 | Chaum |
| 2010/0179452 A1 | 7/2010 | Srinivasan |
| 2010/0182242 A1 | 7/2010 | Fields et al. |
| 2010/0182450 A1 | 7/2010 | Kumar |
| 2010/0198494 A1 | 8/2010 | Chao |
| 2010/0199232 A1 | 8/2010 | Mistry et al. |
| 2010/0245585 A1 | 9/2010 | Fisher et al. |
| 2010/0267276 A1 | 10/2010 | Wu |
| 2010/0292917 A1 | 11/2010 | Emam et al. |
| 2010/0298976 A1 | 11/2010 | Sugihara et al. |
| 2010/0108999 A1 | 12/2010 | Chomenky |
| 2010/0305845 A1 | 12/2010 | Alexandre et al. |
| 2011/0066383 A1 | 3/2011 | Jangle |
| 2011/0071830 A1 | 3/2011 | Kim |
| 2011/0092249 A1 | 4/2011 | Evanitsky |
| 2011/0181422 A1 | 7/2011 | Tran |
| 2011/0187640 A1 | 8/2011 | Jacobsen |
| 2011/0211760 A1 | 9/2011 | Boncyk |
| 2011/0216006 A1 | 9/2011 | Litschel |
| 2011/0221670 A1 | 9/2011 | King, III et al. |
| 2011/0260681 A1 | 10/2011 | Guccione |
| 2011/0307172 A1 | 12/2011 | Jadhav et al. |
| 2012/0016578 A1 | 1/2012 | Coppens |
| 2012/0053826 A1 | 3/2012 | Slamka |
| 2012/0062357 A1 | 3/2012 | Slamka |
| 2012/0069511 A1 | 3/2012 | Azera |
| 2012/0075168 A1 | 3/2012 | Osterhout et al. |
| 2012/0085377 A1 | 4/2012 | Trout |
| 2012/0092161 A1 | 4/2012 | West |
| 2012/0092460 A1 | 4/2012 | Mahoney |
| 2012/0123784 A1 | 5/2012 | Baker et al. |
| 2012/0136666 A1 | 5/2012 | Corpier et al. |
| 2012/0143495 A1 | 6/2012 | Dantu |
| 2012/0162423 A1 | 6/2012 | Xiao et al. |
| 2012/0166077 A1 | 6/2012 | Herzog |
| 2012/0194552 A1 | 8/2012 | Osterhout et al. |
| 2012/0206335 A1 | 8/2012 | Osterhout et al. |
| 2012/0206607 A1 | 8/2012 | Morioka |
| 2012/0207356 A1 | 8/2012 | Murphy |
| 2012/0214418 A1 | 8/2012 | Lee |
| 2012/0232430 A1 | 9/2012 | Boissy et al. |
| 2012/0249797 A1 | 10/2012 | Haddick et al. |
| 2012/0252483 A1 | 10/2012 | Farmer et al. |
| 2012/0316884 A1 | 12/2012 | Rozaieski et al. |
| 2012/0323485 A1 | 12/2012 | Mutoh |
| 2012/0327194 A1 | 12/2012 | Shiratori |
| 2013/0002452 A1 | 1/2013 | Lauren |
| 2013/0024117 A1 * | 1/2013 | Pavetti ................ G01C 21/16 701/538 |
| 2013/0044005 A1 | 2/2013 | Foshee et al. |
| 2013/0046541 A1 | 2/2013 | Klein et al. |
| 2013/0325327 A1 | 2/2013 | Yamaoka |
| 2013/0066636 A1 | 3/2013 | Singhal |
| 2013/0079061 A1 | 3/2013 | Jadhav |
| 2013/0115579 A1 | 5/2013 | Taghavi |
| 2013/0116559 A1 | 5/2013 | Levin |
| 2013/0127980 A1 | 5/2013 | Haddick |
| 2013/0128051 A1 | 5/2013 | Velipasalar et al. |
| 2013/0131985 A1 | 5/2013 | Weiland et al. |
| 2013/0141576 A1 | 6/2013 | Lord et al. |
| 2013/0155474 A1 | 6/2013 | Roach et al. |
| 2013/0157230 A1 | 6/2013 | Morgan |
| 2013/0184982 A1 | 7/2013 | DeLuca |
| 2013/0202274 A1 | 8/2013 | Chan |
| 2013/0211718 A1 | 8/2013 | Yoo et al. |
| 2013/0218456 A1 | 8/2013 | Zelek et al. |
| 2013/0228615 A1 | 9/2013 | Gates et al. |
| 2013/0229669 A1 | 9/2013 | Smits |
| 2013/0245396 A1 | 9/2013 | Berman et al. |
| 2013/0250078 A1 | 9/2013 | Levy |
| 2013/0250233 A1 | 9/2013 | Blum et al. |
| 2013/0253818 A1 | 9/2013 | Sanders et al. |
| 2013/0271584 A1 | 10/2013 | Wexler et al. |
| 2013/0290909 A1 | 10/2013 | Gray |
| 2013/0307842 A1 | 11/2013 | Grinberg et al. |
| 2013/0311179 A1 | 11/2013 | Wagner |
| 2013/0328683 A1 | 12/2013 | Sitbon et al. |
| 2013/0332452 A1 | 12/2013 | Jarvis |
| 2014/0009561 A1 | 1/2014 | Sutherland |
| 2014/0031081 A1 | 1/2014 | Vossoughi |
| 2014/0031977 A1 | 1/2014 | Goldenberg et al. |
| 2014/0032596 A1 | 1/2014 | Fish et al. |
| 2014/0037149 A1 | 2/2014 | Zetune |
| 2014/0071234 A1 | 3/2014 | Millett |
| 2014/0085446 A1 | 3/2014 | Hicks |
| 2014/0087707 A1 | 3/2014 | Gustafsson |
| 2014/0098018 A1 | 4/2014 | Kim et al. |
| 2014/0100773 A1 | 4/2014 | Cunningham et al. |
| 2014/0125700 A1 | 5/2014 | Ramachandran |
| 2014/0132388 A1 | 5/2014 | Alalawi |
| 2014/0133290 A1 | 5/2014 | Yokoo |
| 2014/0184384 A1 | 7/2014 | Zhu et al. |

(56) References Cited

U.S. PATENT DOCUMENTS

| | | |
|---|---|---|
| 2014/0222023 A1 | 8/2014 | Kim et al. |
| 2014/0251396 A1 | 9/2014 | Subhashrao et al. |
| 2014/0253702 A1 | 9/2014 | Wexler |
| 2014/0278070 A1 | 9/2014 | McGavran |
| 2014/0281943 A1 | 9/2014 | Prilepov |
| 2014/0287382 A1 | 9/2014 | Villar Cloquell |
| 2014/0309806 A1* | 10/2014 | Ricci ............... B60Q 1/00 701/1 |
| 2014/0313040 A1 | 10/2014 | Wright, Sr. |
| 2014/0335893 A1 | 11/2014 | Ronen |
| 2014/0343846 A1 | 11/2014 | Goldman et al. |
| 2014/0345956 A1 | 11/2014 | Kojina |
| 2014/0347265 A1 | 11/2014 | Aimone |
| 2014/0368412 A1 | 12/2014 | Jacobsen |
| 2014/0369541 A1 | 12/2014 | Miskin |
| 2014/0379336 A1 | 12/2014 | Bhatnagar |
| 2015/0002808 A1 | 1/2015 | Rizzo, III et al. |
| 2015/0016035 A1 | 1/2015 | Tussy |
| 2015/0063661 A1 | 3/2015 | Lee |
| 2015/0081884 A1 | 3/2015 | Maguire |
| 2015/0099946 A1 | 4/2015 | Sahin |
| 2015/0109107 A1 | 4/2015 | Gomez et al. |
| 2015/0120186 A1 | 4/2015 | Heikes |
| 2015/0141085 A1 | 5/2015 | Nuovo et al. |
| 2015/0142891 A1 | 5/2015 | Haque |
| 2015/0125831 A1 | 7/2015 | Chandrashekhar Nair et al. |
| 2015/0185022 A1* | 7/2015 | Yoo ............... G01C 21/206 701/408 |
| 2015/0196101 A1 | 7/2015 | Dayal et al. |
| 2015/0198454 A1 | 7/2015 | Moore et al. |
| 2015/0198455 A1 | 7/2015 | Chen |
| 2015/0199566 A1 | 7/2015 | Moore et al. |
| 2015/0201181 A1 | 7/2015 | Moore et al. |
| 2015/0211858 A1 | 7/2015 | Jerauld |
| 2015/0219757 A1 | 8/2015 | Boelter et al. |
| 2015/0223355 A1 | 8/2015 | Fleck |
| 2015/0256977 A1 | 9/2015 | Huang |
| 2015/0257555 A1 | 9/2015 | Wong |
| 2015/0260474 A1 | 9/2015 | Rublowsky |
| 2015/0262509 A1 | 9/2015 | Labbe |
| 2015/0279172 A1 | 10/2015 | Hyde |
| 2015/0336276 A1 | 11/2015 | Song |
| 2015/0341591 A1 | 11/2015 | Kelder et al. |
| 2015/0346496 A1 | 12/2015 | Haddick et al. |
| 2015/0356837 A1 | 12/2015 | Pajestka |
| 2015/0364943 A1 | 12/2015 | Vick |
| 2015/0367176 A1 | 12/2015 | Bejestan |
| 2015/0369623 A1 | 12/2015 | Blumenberg |
| 2015/0375395 A1 | 12/2015 | Kwon |
| 2016/0007158 A1 | 1/2016 | Venkatraman |
| 2016/0028917 A1 | 1/2016 | Wexler |
| 2016/0042228 A1 | 2/2016 | Opalka |
| 2016/0098138 A1 | 4/2016 | Park |
| 2016/0156773 A1* | 6/2016 | Chanda ............. H04M 1/72522 455/414.1 |
| 2016/0156850 A1 | 6/2016 | Werblin et al. |
| 2016/0198319 A1 | 7/2016 | Huang |
| 2017/0089714 A1* | 3/2017 | Liu ............... G01C 21/36 |

FOREIGN PATENT DOCUMENTS

| | | |
|---|---|---|
| WO | WO 0010073 | 2/2000 |
| WO | WO 0038393 | 6/2000 |
| WO | WO 179956 | 10/2001 |
| WO | WO 2004/076974 | 9/2004 |
| WO | WO 2006/028354 | 3/2006 |
| WO | WO 2006/045119 | 5/2006 |
| WO | WO 2007/031782 | 3/2007 |
| WO | WO 2008/008791 | 1/2008 |
| WO | WO2008015375 | 2/2008 |
| WO | WO 2008/035993 | 3/2008 |
| WO | WO 2008/096134 | 8/2008 |
| WO | WO2008127316 | 10/2008 |
| WO | WO 2010/062481 | 6/2010 |
| WO | WO 2010/109313 | 9/2010 |
| WO | WO 2012/040703 | 3/2012 |
| WO | WO2012163675 | 12/2012 |
| WO | WO 2013/045557 | 4/2013 |
| WO | WO 2013/054257 | 4/2013 |
| WO | WO 2013/067539 | 5/2013 |
| WO | WO 2013/147704 | 10/2013 |
| WO | WO2014104531 | 7/2014 |
| WO | WO 2014/138123 | 9/2014 |
| WO | WO 2014/172378 | 10/2014 |
| WO | WO2015065418 | 5/2015 |
| WO | WO2015092553 | 6/2015 |
| WO | WO 2015/108882 | 7/2015 |
| WO | WO2015127062 | 8/2015 |

OTHER PUBLICATIONS

Notice of Allowance from U.S. Patent and Trademark Office dated Jul. 21, 2016 from corresponding U.S. Appl. No. 14/703,148.

* cited by examiner

RESPONSIVE ROUTE GUIDANCE AND IDENTIFICATION SYSTEM

BACKGROUND

1. Field of the Invention

The present application relates generally to an electronic system, and in particular to a system designed to provide route guidance and obstacle avoidance feedback to assist visually impaired users navigate without incident.

2. Description of Related Art

More than 7 million people go blind each year in the United States. Blindness can arise from one of many different causes, such as macular degeneration, accident or injury, diabetes, and so on. Blindness works to severely limit one's ability to be mobile. This lack of mobility inherently results often in the seclusion, depression, and inability of those individuals from engaging in the public environment.

Various methods or devices have been developed to assist blind individuals in navigating and engaging in the public environment. For example, seeing-eye dogs are used to help direct an individual. Although dogs help in terms of general navigation, the dog is unable to provide accurate and detailed navigation to the blind. Additional disadvantages to the use of trained dogs to solve navigation issues is that the training of dogs can be very time consuming and costly. Additionally, distractions may arise which may get in the way of the dog performing despite training.

Another method or device is the elongated stick. The blind individual is tasked with repetitively passing the stick in a sideways motion in front of them to alert them to any obstacles. This stick only provides immediate obstacle detection but provides no additional benefit.

Although great strides have been made in the area of mobility aids for the visually impaired, considerable shortcomings remain in helping them freely navigate through society. Most navigation systems today are designed to provide route guidance with little regard to potential obstacles. Obstacles may be dynamic or static in nature. For example, a map program may provide turn by turn instructions at selected points of interest but does not typically care what happens between such points. These systems deal with a relatively unchanging map to provide routes. Some steps have been taken to design a system that accounts for changes and obstacles on the road. These are incorporated into vehicles to allow the vehicle to adjust speed or stop as obstacles arise. Taken to another level, self-driving cars are contemplated that will autonomously navigate the route on behalf of the user. However, there are large limitations on being able to process and account for obstacles that are dynamic in nature. These cars have an assortment of difficulties in traversing traffic.

On a large scale and in limited situations, these systems may be sufficient. However, traveling or navigating is not always done on standard routes via streets, or outside exposed to the elements. A large amount of our traveling is done inside buildings, amongst ever changing environments from moving people, objects, and hazards. A more portable and adaptable system is needed that will adapt to non-mainstream or high-level routes, provide object detection, and communicate commands to the user to avoid the objects while maintaining the best route to the overall destination. A system such as this is needed especially for visually impaired users to navigate freely in society.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, wherein:

Figure 1:
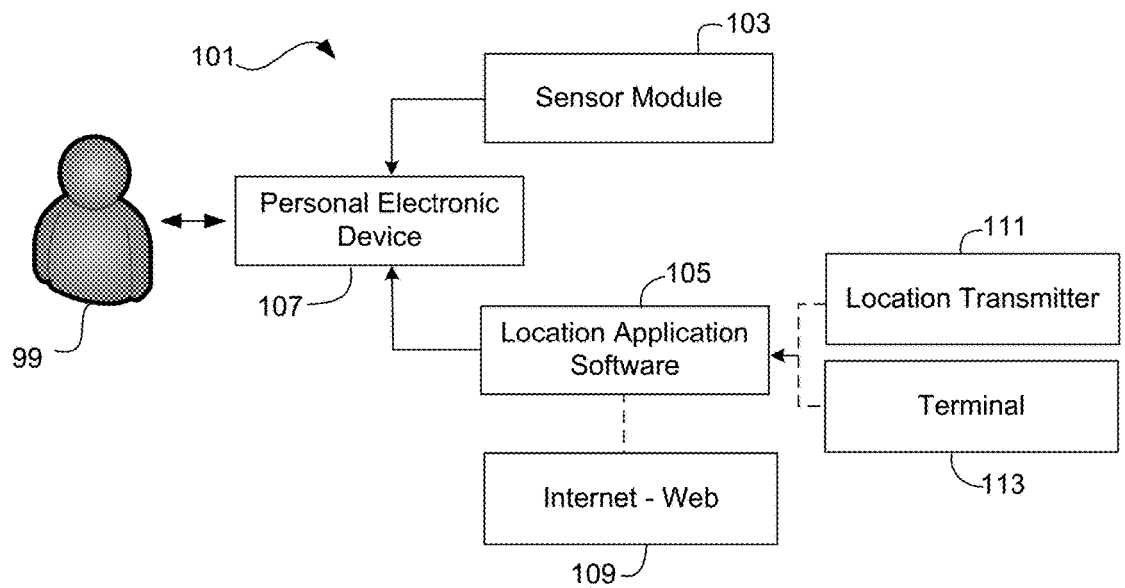
FIG. 1 is a schematic of a responsive route guidance and identification system according to an embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the application to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the preferred embodiment are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The system and method of use in accordance with the present application overcomes one or more of the above-discussed problems commonly associated with seeing aides and navigation devices for the visually impaired. Specifically, the system of the present application is configured to provide navigation assistance to visually impaired individuals. The system is designed to capture static environmental characteristics and combine that with active detection of both static and dynamic obstructions. These are processed through an algorithm to generate communication information provided to the user as to how best to navigate the environment. The system is configured to receive a destination point to travel to and then provide course adjustments to the individual along the route. These and other unique features of the system are discussed below and illustrated in the accompanying drawings.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless otherwise described.

The system of the present application includes a portable electronic device with a processor, one or more sensors, a location application with the portable electronic device, and a communication module. The system is configured to be carried by a visually impaired individual ("user") to first provide general route guidance using the location application. The system is also configured to incorporate the one or more sensors to selectively detect obstacles along the path of the user that are not reflected in the location application. The processor receives data from the one or more sensors and the location application and generates communication data. The user is provided real time instructions and corrections so as to navigate around detected obstructions along the route.

As stated, the system can calculate the position of the user and provide route guidance to the user for a selected destination. The location application can receive route or map information based on any number of sources. One such source of location application data is a GPS map for travel outside. Another example is layout data for buildings. These may be provided via a terminal at an entrance of the building. The system is configured to alternate between location application data, or in other words between exterior and interior maps. This information is compared with and processed in combination with the sensor data.

Referring now to the Figures wherein like reference characters identify corresponding or similar elements in form and function throughout the several views. FIG. 1 in the drawings illustrates an adaptive route guidance system 101 according to the present application. System 101 includes sensor module 103 and location application software (LAS) 105. Module 103 is configured to selectively monitor and detect obstacles potentially within the path of user 99. LAS 105 is configured to capture layout data related to the environment around the user and provide it to personal electronic device 107. Device 107 is configured to process data received from module 103 and LAS 105 to generate communication data for user 99. The communication data is provided to the user to assist in navigating a route. The communication data is provided in real time as environmental conditions (i.e. as objects are detected and monitored) change.

LAS 105 is designed to either store particular layout data related to indoor and outdoor environments, or selectively download/receive/obtain layout data as needed depending on the route taken by the user. It is not always possible to store sufficient layout data for all conceivable routes. Therefore, LAS 105 is configured to obtain layout data from any number of sources. For example, LAS 105 may communicate over the internet 109 to upload and download information either indoor or outdoor layout data. For example, mapping is provided through different providers over the internet for basic route guidance using outdoor layout data. As most indoor locations are not mapped and online, system 101 may further include the use of a location transmitter 111 and a terminal 113. Terminal 113 being configured to provide a detailed indoor layout to LAS 105 and transmitter 111 being configured to pinpoint the location of the user inside the structure. Additionally, LAS 105 may use GPS technology to provide route guidance based on location points.

Figure 2:
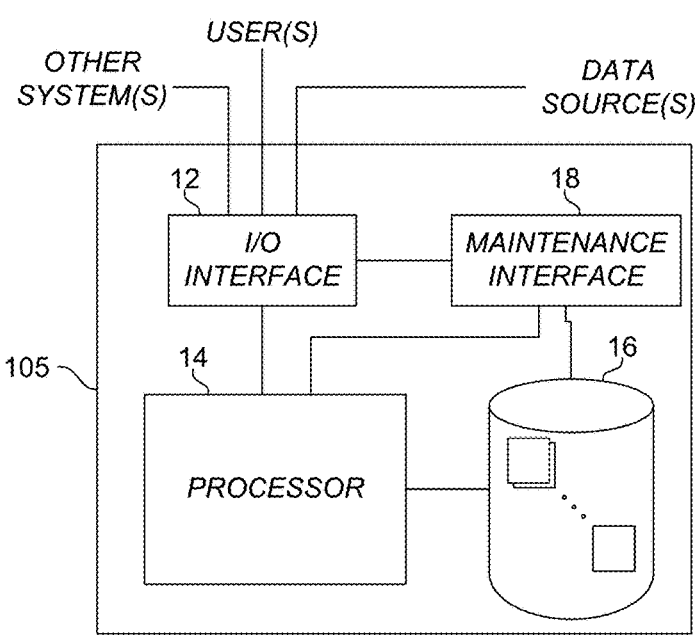
FIG. 2 is an exemplary chart illustrating a portable electronic device used in the responsive route guidance and identification system of FIG. 1.

Referring now in particular to FIG. 2 in the drawings, device 107 is described in more detail. FIG. 2 illustrates an exemplary schematic of device 107. FIG. 2 is an exemplary configuration and design for device 107 used to identify user's 99 current location and transmit command data to user 99 to instruct user 99 how to navigate between two or more locations. As stated previously, the illustrated configuration permits for wireless and wired communications as well as internet/web communications. It is understood that module 103 and other optional devices (113, 111) may also be represented by the features and elements herein described in FIG. 2. Module 103 and terminal 111 may also have one or more processors, input/output interfaces, and storage methods.

The device 107 includes an input/output (I/O) interface 12, a processor 14, a database 16, and a maintenance interface 18. Alternative embodiments can combine or distribute the input/output (I/O) interface 12, optimization engine 14, database 16, and maintenance interface 18 as desired. Embodiments of device 107 can include one or more computers that include one or more processors and memories configured for performing tasks described herein below. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers includes a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example smart phones, electronic tablets, personal data assistants, and computer workstations, that are suitable for also performing other tasks. Furthermore the computers and machines may use transitory and non-transitory forms of computer-readable media. Non-transitory computer-readable media is to be interpreted to comprise all computer-readable media, with the sole exception of being a transitory, propagating signal.

The I/O interface 12 provides a communication link between external users, systems, and data sources and components of device 107. The I/O interface 12 can be configured for allowing one or more users to input information to device 107 via any known input device, such as a display or via voice command. Examples can include a keyboard, mouse, touch screen, microphone, and/or any other desired input device. The I/O interface 12 can be configured for allowing one or more users to receive information output from device 107 via any known output device. Examples can include illustrated examples shown in FIG. 5, including microphone 115, speaker 117 and sensory equipment 119, and/or any other desired output device. The I/O interface 12 can be configured for allowing other systems to communicate with device 107. For example, the I/O interface 12 can allow one or more remote computers to access information, input information, and/or remotely instruct device 107 to perform one or more of the tasks described herein. The I/O interface 12 can be configured for allowing communication with one or more remote data sources.

The database 16 provides persistent data storage for device 107. While the term "database" is primarily used, a memory or other suitable data storage arrangement may provide the functionality of the database 16. In alternative embodiments, the database 16 can be integral to or separate from device 107 and can operate on one or more computers or computerized electronic devices. The database 16 preferably provides non-volatile data storage for any information suitable to support the operation of device 107. Database 16 stores data used in the generation of route guidance and communication of description information 121. Examples may include, turn by turn instructions, distances, attributes and descriptions of objects, maps, building plans, algorithms and so forth.

The maintenance interface 18 is configured to allow users to maintain desired operation of device 107. In some embodiments, the maintenance interface 18 can be configured to allow for reviewing and/or revising the data stored in the database 16 and/or performing any suitable administrative tasks commonly associated with database management. This can include, for example, updating database management software, revising security settings, and/or performing data backup operations. In some embodiments, the maintenance interface 18 can be configured to allow for maintenance of processor 14 and/or the I/O interface 12. This can include, for example, software updates and/or administrative tasks such as security management and/or adjustment of certain tolerance settings.

The processor 14 is configured to determine the location of the user and transmit route guidance and description information to user 99. Processor 14 also receives signal data from transmitters 111 to ascertain the current location of user 99 in preparation of formulating route instructions. Processor 14 may access and compare information stored on database 16 for producing such information and guidance. Processor 14 can include various combinations of one or more processors, memories, and software components.

Figure 3:
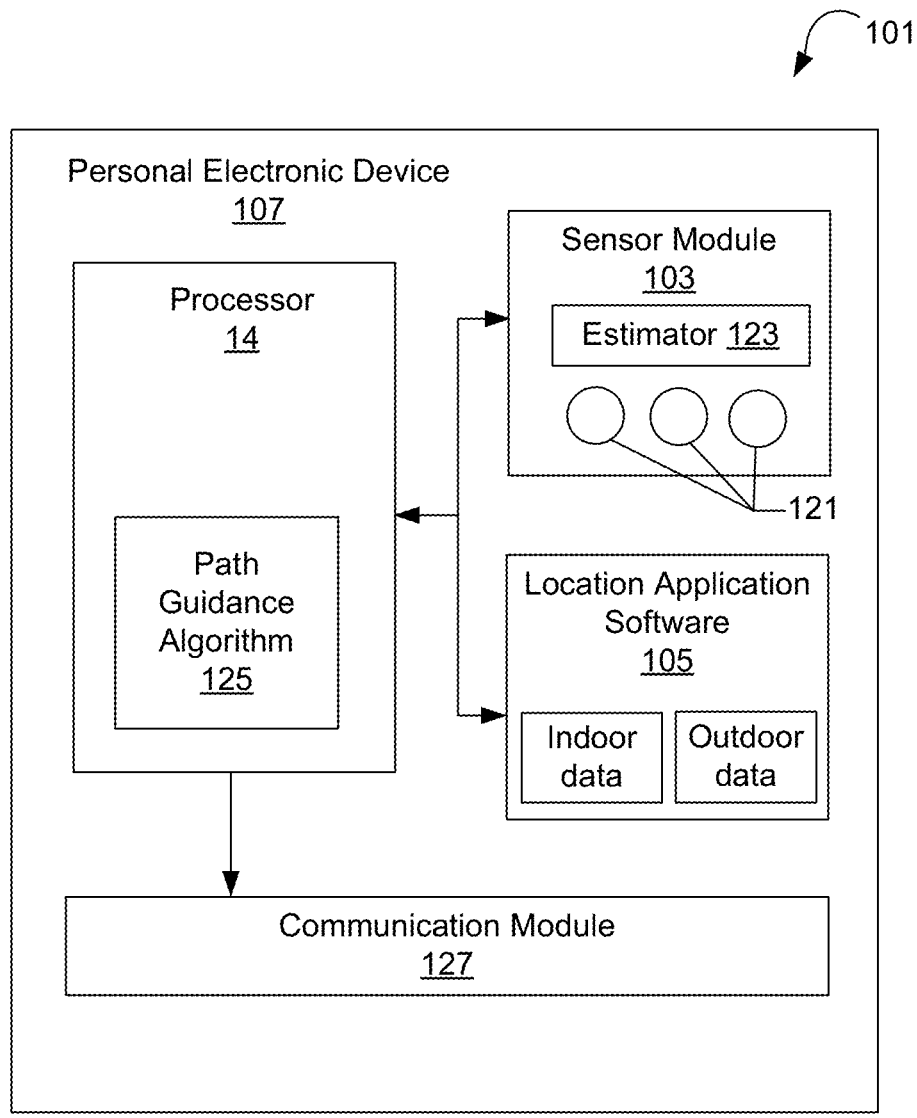
FIG. 3 is an exemplary embodiment of the responsive route guidance and identification system of FIG. 1.

Referring now also to FIG. 3 in the drawings, an exemplary embodiment of system 101 is illustrated. In this embodiment, the various components described within system 101 of FIG. 1 are fully encapsulated within device 107. System 101 is configured to be a fully portable and responsive system configured to analyze and compare environmental objects and layout data to determine an efficient route of travel for the user. The route is adjusted in real time according to changes in layout data and sensor data as a result of environmental conditions.

Sensor module 103 is configured to include one or more sensors 121 that monitor/scan the environment for objects that may be in the path of the user when following the route. These objects may be stationary and/or moving (i.e. static and/or dynamic in motion). As a user traverses a particular route, traditional layout data (maps) cannot provide details related to some static environmental conditions, and most dynamic environmental conditions. For example, a static environmental condition such as the location of light posts, signs, or building pillars may be known and identified on outdoor layout data in LAS 105. However, static environmental conditions may be temporary, such as barriers, people, vehicles, animals, furniture, and so forth. The differentiation of static and dynamic is made in relation to the user at the time of detection. Therefore objects may be classified as either or both static and dynamic depending on the instantaneous conditions of the object.

Traditional layout data is void of determining dynamic and some static environmental conditions. Sensors 121 are used to identify objects in the route of the user and process that information within the module 103. Sensors 121 may operate by any number of means to accomplish such a task. For example, sensor 121 may be an electromagnetic sensor works on the same principle as any other radar. High frequency RF pulses are transmitted by sensor 121 which then bounce off an object. The time for a return signal is measured by a time-gated return RF mixer. RF reflections are analyzed to produce presence, distance, and motion measurements. Module 103 can precisely detect the onset of objects and the separation distances from the user spaces. This type of sensor 121 is tuned for offset, minimum range, and maximum range based on installation configuration. Another example of sensor 121 is an ultrasonic sensor. These are highly sophisticated devices that create sharp radio signals for detecting objects. They use the echo time of the radio signals bouncing from the obstacles to indicate the distance of the obstacle. Ultrasonic sensors are usually found in a plurality or set and located in an evenly displaced pattern. They detect objects even when the user is stationary. Other types of sensors are contemplated.

The approach to identifying and then tracking objects are different between types of sensors. It is important to note that sensors 121 and module 103 are adapted to monitor and analyze data related to direction, velocity, and curvature of path for objects in the environment. With static objects, system 101 can easily process the precise location of the object and provide communication to the user as to how to avoid it. With relation to dynamic objects, the system is required to analyze and process more information. To safely avoid dynamic obstacles, module 103 may include a motion estimator 123. The motion estimator 123 is configured to process data from sensors 121 and as accurately as possible predict the movements and trajectory of each object. The trajectory and movements of the user, as monitored and tracked within system 101, are compared to each dynamic object and a course or route adjustment is determined if necessary. The analysis and comparison of trajectories and movements are performed at predefined intervals. The intervals may be separated by a time period or performed continuously.

To assist in predicting the movements and tracking each dynamic object, estimator 123 may be configured to receive layout data from LAS 105. Layout data can be used to assist in predicting movements based in that estimator 123 may recognize predefined passages or walkways. Physical limitations found in layout data may be used to eliminate movement possibilities for objects as much as it does for the user.

Additionally, estimator 123 may be configured to classify objects based upon any number of characteristics in order to predict potential movements. For example, characteristics such as size, shape, and speed may be used. If system 101 can differentiate between a child and an adult and that of a rolling cart, processing time may be diminished and more accurate predictions may be produced.

LAS 105 is a software application configured to receive layout data related to both indoor and outdoor environments. LAS 105 is in communication with processor 14 and selectively with module 103. LAS 105 may switch between layouts depending on the route of the user. Layout data may be provided via known methods of data transmission, and as discussed previously with respect to FIG. 1.

Processor 14 is configured to receive data from both module 103 and LAS 105 and process that data through a path guidance algorithm 125. Algorithm 125 is a procedure or formula for analyzing: 1) movements and location of objects within the route of the user; 2) layout data of the environment; and 3) the movements of the user. Algorithm 125 processes this information according to a defined sequence of specified actions. Each of the three areas are continuously compared and analyzed to determine what if any communications should be made to the user. It is understood that module 103 may not always include estimator 123. Algorithm 125 and processor 14 may be utilized to process and handle the functions of estimator 125.

Figure 5:
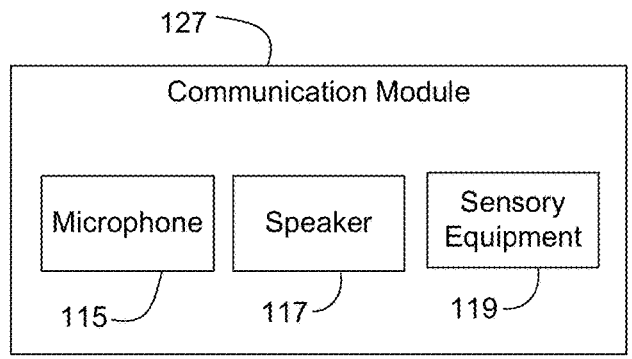
FIG. 5 is a chart of communication methods for a communication module used in the responsive route guidance and identification system of FIG. 1.

Communication module 127 is in communication with processor 14 and algorithm 125. Module 127 receives communication data from processor 14 and generates a communication manifestation or notification to the user. The communication can be manifested in any number of ways. For example, the communication may be through audible or sensory means. Referring now also to FIG. 5 in the drawings, a chart of communication methods for module 127 are illustrated. The communication may be provided verbally via a speaker 117 to allow the user to react via verbal cues. Additionally, sensory equipment 119 may be used where physical manifestations are provided to the user. These may be realized by vibrations, or physical movements along the body of the user. Equipment 119 may be worn around the body of the user wherein selected patterns of movements of the equipment may communicate selected actions by the user. The equipment may communicate via wires or wirelessly with device 107. Reliance upon verbal communication only is not always ideal in loud environments wherein the user may miss selected cues or instructions. Equipment 119 are an alternative method and may be employed simultaneously with audible methods. Module 127 may also include an input interface of a speaker 115 to permit voice command data from the user to be captured by system 101. Although system 101 is designed for visually impaired individuals, not all visually impaired individuals are fully blind. Therefore, some sensory equipment 119 may include visual displays.

Figure 4:
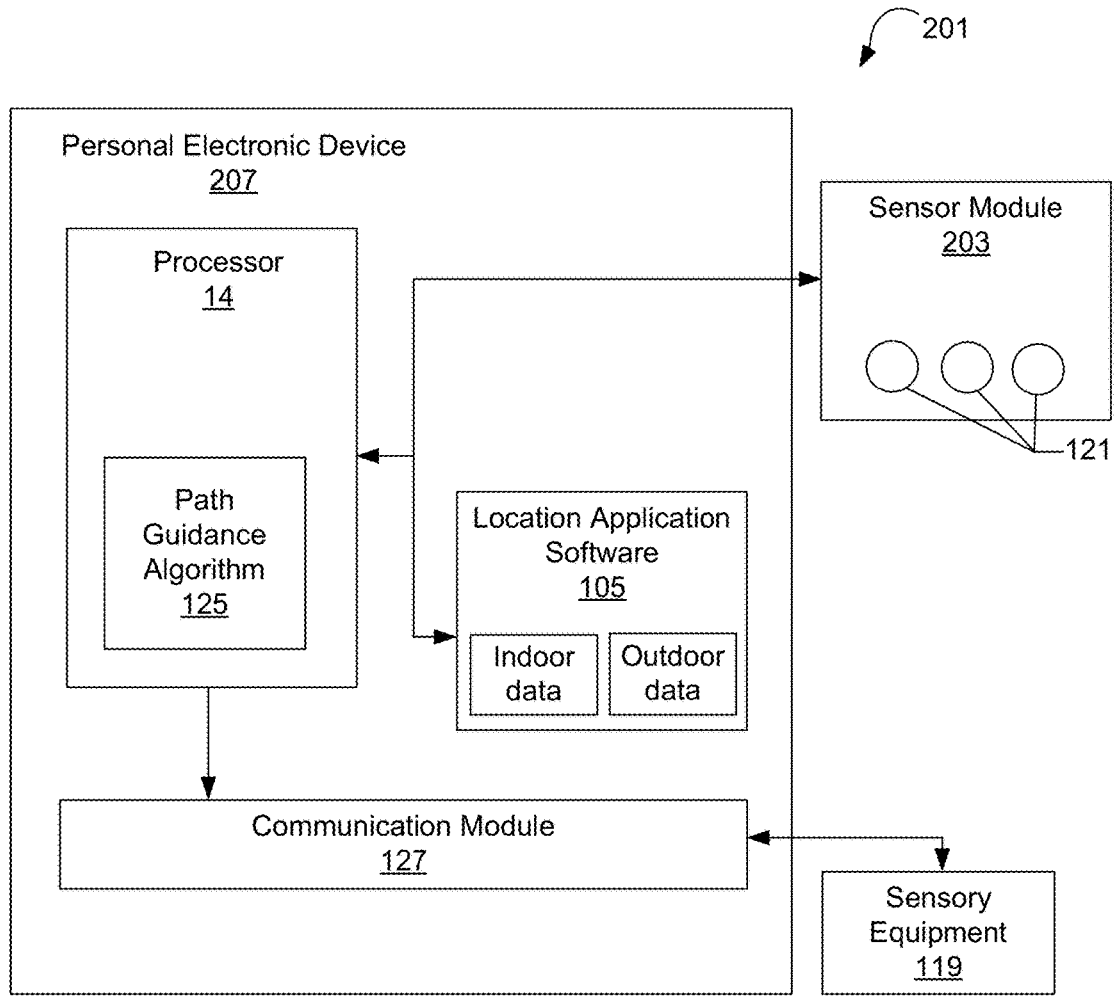
FIG. 4 is an alternative exemplary embodiment of the responsive route guidance and identification system of FIG. 1.

Referring now also to FIG. 4 in the drawings, an alternative exemplary embodiment of system 101 is illustrated. System 201 is similar in form and function to that of corresponding members/elements of system 101 as shown in FIG. 3 except as herein described. In system 201, sensor module 103 is separated from device 107, now labeled as module 203. In this configuration, device 107 may more easily be any existing type of electronic device common to the user, such as a smart phone, portable electronic tablet, personal data assistant, and so forth. This configuration would allow for lower costs associated with bringing the system to market in that existing devices, such as smart phones and tablets for example, that the user already has may be used to perform the described overall functions of each system. System 201 uses device 207 which is similar in form and function to that of device 107. Module 203 is therefore in wired/wireless communication with device 207 and is located somewhere in the proximity of the user to monitor his/her movements as well as environmental objects. It is understood that with either system 101 and/or system 201, selected application software is included for download and operation on device 107 or 207 to incorporate module 103/203.

Additionally, it is seen that estimator 123 is not associated with module 203. It is understood that estimator 123 is operable with system 202 but is illustrated in such manner to show the sensor module without it. As stated previously, algorithm 125 may be used to perform the duties and functions of estimator 123 when it is not present in module 103/203. Similarly, sensory equipment 119 is illustrated remote from device 207. Equipment 119 may both receive data from module 127 and also provide feedback to module 127 and processor 125. This feedback can be useful for device 207 in monitoring the movements of the user. For example, equipment 119 may be a sensor on the leg which can monitor its movements. Communication between processor 14 and equipment 119 may alert system 201 that the user if the user is not taking appropriate action to an obstacle, like a stair or step. Communications from module 127 may be provided to the user based upon feedback from sensory equipment 119. This described function and operation of sensory equipment 119 is found on either system 101 and/or system 201.

Figure 6:
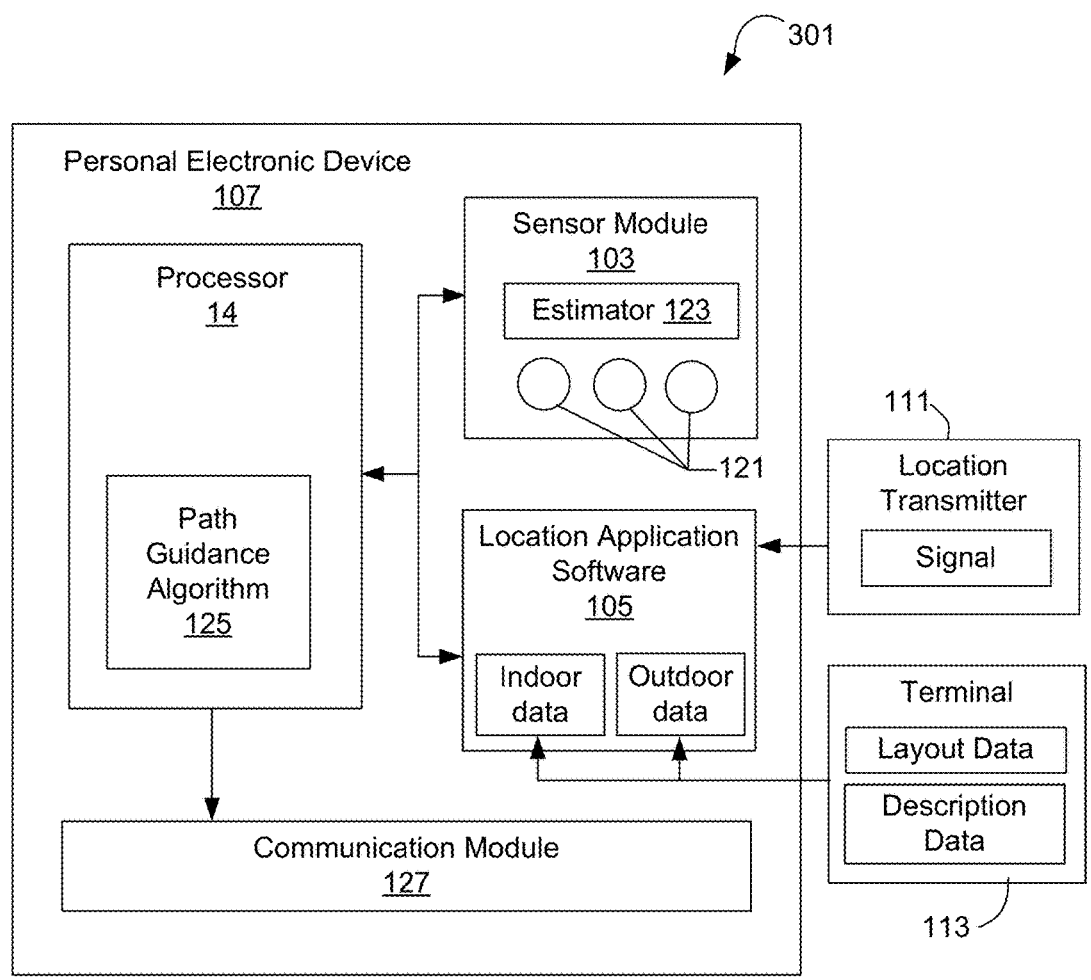
FIG. 6 is an alternative exemplary embodiment of the responsive route guidance and identification systems of FIGS. 3 and 4.

Referring now also to FIG. 6 in the drawings, an alternative embodiment of system 101 is illustrated. System 301 is similar in form and function to that of systems 101 and 201. System 301 differs in the inclusion of terminal 113 and transmitter 111. Either of systems 101 and 201 may include terminal 113 and transmitters 111. Traditional layout data for outdoor use is typically not accurate enough or not available for indoor use or areas where precise locations are necessary. In such times, the system of the present application may include a terminal 113 configured to provide layout data in the form of either indoor data or outdoor data, and description data related to the defined area designated in the layout data. For example, layout data from terminal 113 may relate to the inner portions of a building. The description data are potentially points of interest or informative aspects of the building or its tenants. In order to determine the location of the user within the defined area, one or more transmitters 111 are used to send out a signal and allow device 107 to triangulate a position. The position, speed, and elevation of the user may be determined.

Data shared within system 101 permits device 107 to calculate the position of the user within a particular area and provide route guidance to the user to a particular destination. Route guidance may include step by step instructions (i.e. turn-by-turn) to perform between locations. System 101 is also configured to optionally provide description data to device 107 to inform user 103 about his/her surroundings. Locations of interest within the area may be communicated to the user, such as details concerning the location of doors, windows, restrooms, exits, and descriptive messages (i.e. "authorized personnel only") are possible.

Terminal 113 is configured to transmit data to device 107. This may be made via known wired and/or wireless methods, including over internet 109 or through direct beaming between terminal 113 and device 107. Terminal 113 may transmit layout data or both layout data and description data. Layout data is data related to the physical characteristics of the area, such as planters, benches, areas of construction and so forth. This data is passed to LAS 105 and processed through processor 14 to provide route guidance to user 99. An ideal location for terminal 113 to exist are at the entrances and exits of the area.

Description data 119 is data related to the details about the surrounding environment. Description data 119 is used to provide greater context and information about user's 103 surroundings. Description data 119 is communicated to device 107 and processed to generate description information to user 99 via module 127. Description information relates to particular characteristics and details about a specific location or may be general in nature. This can be thought of as information that may typically be observable to a user with reasonable vision. Examples of description information include particular points of interest, such as exits, help desks, and emergency services. As seen with this example, some layout features of the layout data can also be communicated as description information. Additionally, description information can be more detailed in that it may convey more details. For example, device 107 may communicate to user 103 where a door is located (point of interest) and may also communicate that an alarm will sound if opened (secondary information). In the context of a business, the description information may relay the type of business, hours of operation, and a short description. Warnings, notices, advertisements, and services are also examples of types of information that may be communicated through description data 119.

Figure 7:
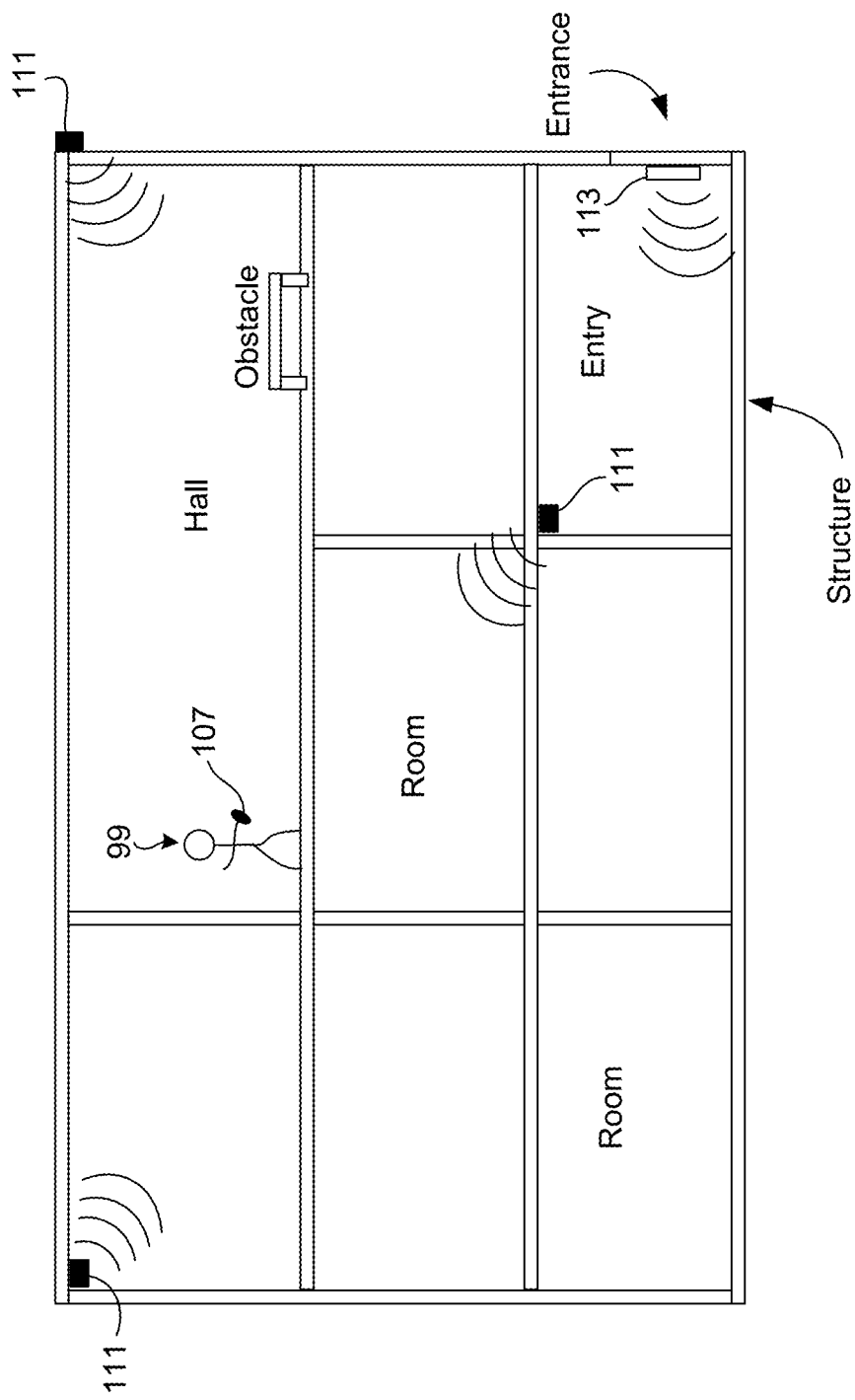
FIG. 7 is an exemplary layout of a building utilizing the responsive route guidance and identification system of FIG. 1.

Referring now also to FIG. 7 in the drawings, an exemplary layout of a building utilizing systems 101/201/301 are illustrated. Route guidance is provided based on the particular location of the user. Device 107 is configured to calculate the location of user 99 within the area by communicating with transmitters 111. Transmitters 111 are selectively positioned throughout the area and are configured to broadcast a signal at some predefined interval. Device 107 receives and processes the signals to generate route guidance. Transmitters 111 are powered by a remote source, remote to that of device 107 (i.e. battery, power grid). Signals may be broadcast continuously be each transmitter 111, and selectively detected by device 107. Other embodiments of transmitters 107 may broadcast signal intermittently, as a pulse for example. The precise location of user 99 is performed by receiving the signal from a plurality of transmitters 107 and processing characteristics of the signals to determine a particular coordinate for user 99. Device 107 may use signal strength as a measure of distance from each transmitter 107.

As seen in FIG. 7, the location of transmitters 111 may be located in remote and rather distant locations throughout a structure or area (inside/outside, different floors). As transmitters 111 are under their own power (i.e. not powered by device 107), their particular location is independent of proximity to device 107. Additionally, transmitters 111 are configured to have varied signal strength that allows an operator to select the strength and reach of the signal. This may be an adjustable feature of transmitters 111 or different types of transmitters 111 may be selected according to the necessary signal strength. An advantage of system 101 is the use of transmitters 107 that are under their own power and can produce far reaching signals. This allows the owner of an area or structure to be able to equip the structure with a fewer number of transmitters 111. Cost to develop greatly decreases compared to systems where the proximity of device 107 is necessary to power and receive information from sensors/transmitters.

In operation, layout data and description data are communicated to device 107 upon entrance into the area through terminal 113. Any necessary or requested information about the area may be broadcast to the user upon entry or at any time during traversing the route. The user may then elect to select a destination by communicating with device 107. User 99 may select a destination according to its physical location or may use categorical designations. For example, user 99 may state a particular Suite #. Additionally, user 99 may request to go to a particular type of establishment. This is useful where there are limited types of destinations fitting the categorical description. Where multiple options are available, device 107 communicates the options with user 99 and seeks clarification. In some situations device 107 may automatically select the destination according to its proximity to the user. For example, user 99 may request the restroom. Upon such a request, device 107 calculates the nearest restrooms in operation for the gender of user 99. Furthermore, if a single destination (i.e. store) has multiple entrances, device 107 may select the nearest one.

Description information may be provided to the user at any time or location along a route, independent of the need of a terminal or the type of layout data provided. LAS 105 is configured to know and recognize points of interest and other important information that the user may be inclined to know. The description information is provided with any of the above mentioned systems.

The associated systems are simplistic and yet effective. Any personal electronic device may be used in communication with a sensor module to compute location and directions. A software application is downloaded onto the device to install the necessary algorithms, functions, and features necessary. By using these systems, it is felt that a visually impaired individual will be granted the ability and freedom to safely navigate through society without much trouble. The system is operable for both indoor and outdoor use.

The current application has many advantages over the prior art including at least the following: (1) the ability and freedom to safely navigate through society without much trouble; (2) route guidance within a structure or area outside the purview of satellite images; (3) operable for both indoor and outdoor use; and (4) minimal overhead investment on the part of the visually impaired and businesses; (5) detection of static and dynamic objects; (6) automatic route adjustment communicated to the user in response to environmental conditions.

The particular embodiments disclosed above are illustrative only, as the application may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. It is apparent that an application with significant advantages has been described and illustrated. Although the present application is shown in a limited number of forms, it is not limited to just these forms, but is amenable to various changes and modifications without departing from the spirit thereof.

What is claimed is:

1. An adaptive route guidance system, comprising: a sensor module configured to selectively monitor and detect obstacles potentially within a path of a user; a location application software configured to capture layout data related to the environment around the user; and a personal electronic device configured to receive data from the sensor module and the location application software, the personal electronic device is configured to process the data within a processor so as to generate communication data, the personal electronic device configured to provide the communication data to the user for navigating a route; a terminal located near an entrance of an area to be traversed, the terminal configured to store and transmit layout data of the area to be traversed to the location application software.

2. The system of claim 1, wherein the sensor module includes one or more sensors.

3. The system of claim 2, wherein the sensor is an electromagnetic sensor.

4. The system of claim 2, wherein the sensor is an ultrasonic sensor.

5. The system of claim 2, wherein the sensor detects static objects.

6. The system of claim 2, wherein the sensor detects dynamic objects.

7. The system of claim 6, wherein the sensor tracks the path of dynamic objects.

8. The system of claim 1, wherein the processor includes a path guidance algorithm used to analyze the data from the sensor module and the data from the location application software to predict the movements of objects.

9. The system of claim 1, wherein the processor includes a path guidance algorithm used to analyze the data from the sensor module and the data from the location application software to modify the route of the user.

10. The system of claim 1, wherein the communication data is presented to the user in the form of at least one of an audible method or physical manifestation movement.

11. The system of claim 1, wherein the location application software is configured to provide layout data for an indoor location.

12. The system of claim 1, wherein the location application software is configured to provide layout data for an outdoor location.

13. The system of claim 1, wherein the location application software is configured to alternate between an indoor layout data and an outdoor layout data.

14. The system of claim 1, further comprising: a plurality of location transmitters selectively positioned throughout the area to be traversed, each location transmitter being powered and configured to broadcast a signal; wherein the portable electronic device is configured to calculate the position of the user by processing the signal from one or more transmitters.

15. The system of claim 1, wherein the portable electronic device is configured to receive description data, the description data used to convey selected points of interest to the user through the portable electronic device, the portable electronic device configured to communicate to the user selected description information based upon the description data.

16. The system of claim 1, wherein the portable electronic device provides description information related to points of interest to the user.

17. The system of claim 16, wherein the description information is provided to the user based upon the route and proximity of the user to the point of interest.

18. The system of claim 1, wherein the user may select a destination by selecting a categorical designation.

19. The system of claim 1, wherein the personal electronic device is configured to receive input data from the user via at least one of a manual entry input and a voice command.

* * * * *